(12) United States Patent
Rahut et al.

(10) Patent No.: US 7,389,485 B1
(45) Date of Patent: Jun. 17, 2008

(54) METHODS OF ROUTING LOW-POWER DESIGNS IN PROGRAMMABLE LOGIC DEVICES HAVING HETEROGENEOUS ROUTING ARCHITECTURES

(75) Inventors: Anirban Rahut, Sunnyvale, CA (US); Satyaki Das, Los Gatos, CA (US); Arifur Rahman, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 228 days.

(21) Appl. No.: 11/390,925

(22) Filed: Mar. 28, 2006

(51) Int. Cl.
*G06F 17/50* (2006.01)

(52) U.S. Cl. .................. 716/12; 716/5; 716/6; 716/13; 716/14; 716/15

(58) Field of Classification Search ............ 716/12–15, 716/5, 6
See application file for complete search history.

(56) References Cited

U.S. PATENT DOCUMENTS

| | | | |
|---|---|---|---|
| 4,698,760 A | 10/1987 | Lemach et al. |
| 5,504,440 A | 4/1996 | Sasaki |
| 5,612,636 A | 3/1997 | Ko |
| 5,654,898 A | 8/1997 | Roetcisoender et al. |
| 5,787,011 A | 7/1998 | Ko |
| 5,808,479 A | 9/1998 | Sasaki et al. |
| 5,811,985 A | 9/1998 | Trimberger et al. |
| 5,815,004 A | 9/1998 | Trimberger et al. |
| 5,880,598 A | 3/1999 | Duong |
| 5,880,967 A | 3/1999 | Jyu et al. |
| 5,892,961 A | 4/1999 | Trimberger |
| 5,914,616 A | 6/1999 | Bauer et al. |
| 5,984,510 A | 11/1999 | Guruswamy et al. |

(Continued)

FOREIGN PATENT DOCUMENTS

WO   WO 00/52826 A   9/2000

(Continued)

OTHER PUBLICATIONS

U.S. Appl. No. 10/693,568, filed Oct. 24, 2003, Lysaght et al.

(Continued)

*Primary Examiner*—Vuthe Siek
*Assistant Examiner*—Nghia M Doan
(74) *Attorney, Agent, or Firm*—Lois D. Cartier; LeRoy D. Maunu (57) ABSTRACT

Methods of routing user designs in programmable logic devices (PLDs) having heterogeneous routing structures, i.e., PLDs including both high-power and low-power interconnect resources. A first pass routing step is performance-based, e.g., utilizes a cost function biased towards the high-power interconnect resources. The first routed design is then evaluated to identify non-critical nets in the first routed design that can yield the most power-saving benefit by being retargeted to the low-power interconnect resources. For example, a sorted list of nets can be created in which the identified nets are evaluated based on the capacitance per load pin of each net. A second pass routing step is then performed, e.g., rerouting the nets identified as being non-critical and having the greatest potential power-saving benefit. In some embodiments, the permitted increase in the delay of each rerouted net is bound by the slack of the net as routed in the first routed design.

18 Claims, 5 Drawing Sheets

U.S. PATENT DOCUMENTS

| | | | |
|---|---|---|---|
| 6,163,168 | A | 12/2000 | Nguyen et al. |
| 6,178,542 | B1 | 1/2001 | Dave |
| 6,269,458 | B1 | 7/2001 | Jeter et al. |
| 6,272,668 | B1 | 8/2001 | Teene |
| 6,348,813 | B1 | 2/2002 | Agrawal et al. |
| 6,362,649 | B1 | 3/2002 | McGowan |
| 6,448,808 | B2 | 9/2002 | Young et al. |
| 6,505,322 | B2 | 1/2003 | Yamashita et al. |
| 6,539,536 | B1 | 3/2003 | Singh et al. |
| 6,583,645 | B1 | 6/2003 | Bennett et al. |
| 6,590,419 | B1 | 7/2003 | Betz et al. |
| 6,621,325 | B2 | 9/2003 | Hart et al. |
| 6,721,924 | B2 | 4/2004 | Patra et al. |
| 6,930,510 | B2 | 8/2005 | New |
| 6,950,998 | B1 | 9/2005 | Tuan |
| 6,960,934 | B2 | 11/2005 | New |
| 2001/0048319 | A1 | 12/2001 | Miyazaki et al. |
| 2002/0069396 | A1 | 6/2002 | Bhattacharya et al. |
| 2004/0174187 | A1* | 9/2004 | New ............ 326/41 |
| 2005/0039155 | A1* | 2/2005 | New ............ 716/16 |

FOREIGN PATENT DOCUMENTS

| | | | |
|---|---|---|---|
| WO | WO 01/28097 A | 4/2001 | |

OTHER PUBLICATIONS

U.S. Appl. No. 10/941,248, filed Sep. 15, 2004, New.

Xilinx, Inc.; "Virtex-II Platform FPGA Handbook"; published Dec. 2000; available from Xilinx, Inc., 2100 Logic Drive, San Jose, California 95124; pp. 33-75.

Michael Hutton, et al.; "Interconnect Enhancements for a High-Speed PLD Architecture"; Feb. 24-26, 2002; available from Altera Corporation, 101 Innovation Drive, San Jose, California 95134; 8 pages.

Vaughn Betz et al.; "FPGA Routing Architecture: Segmentation and Buffering to Optimize Speed and Density"; ACM/SIGDA International Symposium on Field Programmable Gate Arrays; FPGA 99; Feb. 21-23, 1999; pp. 59-68.

Ping-Tsung Wang et al.; "A Hierarchical Interconnection Structure for Field-Programmable Gate Arrays"; Institute of Electrical and Electronics Engineers; Proceedings of the Region Ten Conference; Oct. 19-21, 1993; vol. 3; pp. 557-560.

Ivo Dobbelaere et al.; "Regenerative Feedback Repeaters for Programmable Interconnections"; IEEE Journal of Solid-State Circuits, IEEE Inc.; vol. 30, No. 11; Nov. 1, 1995; pp. 1246-1253.

Arifur Rahman et al.; "Heterogeneous Routing Architecture for Low-Power FPGA Fabric"; IEEE 2005 Custom Integrated Circuits Conference; Copyright 2005 IEEE; pp. 183-186.

Fei Li et al.; "Low-Power FPGA Using Pre-defined Dual-Vdd/Dual-Vt Fabrics"; FPGA 04; Feb. 22-24, 2004; Copyright 2004 ACM; pp. 4250.

* cited by examiner

METHODS OF ROUTING LOW-POWER DESIGNS IN PROGRAMMABLE LOGIC DEVICES HAVING HETEROGENEOUS ROUTING ARCHITECTURES

FIELD OF THE INVENTION

The invention relates to programmable logic devices (PLDs). More particularly, the invention relates to methods of routing designs for low-power applications in PLDs having heterogeneous routing architectures.

BACKGROUND OF THE INVENTION

Programmable logic devices (PLDs) are a well-known type of integrated circuit that can be programmed to perform specified logic functions. One type of PLD, the field programmable gate array (FPGA), typically includes an array of programmable tiles. These programmable tiles can include, for example, input/output blocks (IOBs), configurable logic blocks (CLBs), dedicated random access memory blocks (BRAM), multipliers, digital signal processing blocks (DSPs), processors, clock managers, delay lock loops (DLLs), and so forth.

Each programmable tile typically includes both programmable interconnect and programmable logic. The programmable interconnect typically includes a large number of interconnect lines of varying lengths interconnected by programmable interconnect points (PIPs). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output (I/O) resources by an interconnect switch matrix. Each function block of the CPLD includes a two-level AND/OR structure similar to those used in Programmable Logic Arrays (PLAs) and Programmable Array Logic (PAL) devices. In CPLDs, configuration data is typically stored on-chip in non-volatile memory. In some CPLDs, configuration data is stored on-chip in non-volatile memory, then downloaded to volatile memory as part of an initial configuration sequence.

For all of these programmable logic devices (PLDs), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Figure 1:
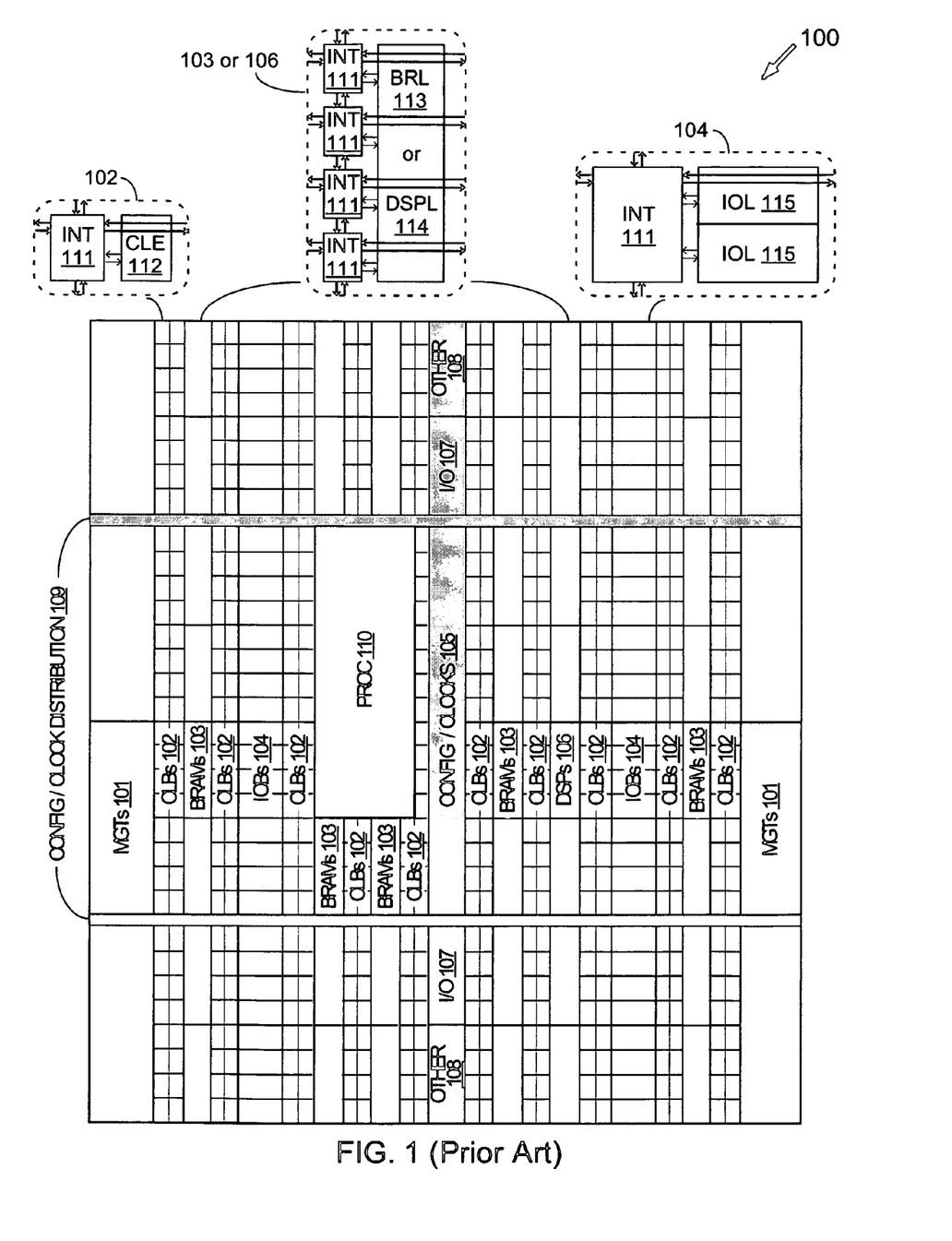
FIG. 1 is a block diagram of an exemplary field programmable gate array (FPGA).

As noted above, advanced FPGAs can include several different types of programmable logic blocks in the array. For example, FIG. 1 illustrates an FPGA architecture 100 that includes a large number of different programmable tiles including multi-gigabit transceivers (MGTs 101), configurable logic blocks (CLBs 102), random access memory blocks (BRAMs 103), input/output blocks (IOBs 104), configuration and clocking logic (CONFIG/CLOCKS 105), digital signal processing blocks (DSPs 106), specialized input/output blocks (I/O 107) (e.g., configuration ports and clock ports), and other programmable logic 108 such as digital clock managers, analog-to-digital converters, system monitoring logic, and so forth. Some FPGAs also include dedicated processor blocks (PROC 110).

In some FPGAs, each programmable tile includes a programmable interconnect element (INT 111) having standardized connections to and from a corresponding interconnect element in each adjacent tile. Therefore, the programmable interconnect elements taken together implement the programmable interconnect structure for the illustrated FPGA. The programmable interconnect element (INT 111) also includes the connections to and from the programmable logic element within the same tile, as shown by the examples included at the top of FIG. 1.

For example, a CL 102 can include a configurable logic element (CLE 112) that can be programmed to implement user logic plus a single programmable interconnect element (INT 111). A BRAM 103 can include a BRAM logic element (BRL 113) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 106 can include a DSP logic element (DSPL 114) in addition to an appropriate number of programmable interconnect elements. An IOB 104 can include, for example, two instances of an input/output logic element (IOL 115) in addition to one instance of the programmable interconnect element (INT 111). As will be clear to those of skill in the art, the actual I/O pads connected, for example, to the I/O logic element 115 are manufactured using metal layered above the various illustrated logic blocks, and typically are not confined to the area of the input/output logic element 115.

In the pictured embodiment, a columnar area near the center of the die (shown shaded in FIG. 1) is used for configuration, clock, and other control logic. Horizontal areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, the processor block PROC 110 shown in FIG. 1 spans several columns of CLBs and BRAMs.

Note that FIG. 1 is intended to illustrate only an exemplary FPGA architecture. For example, the numbers of logic blocks in a column, the relative width of the columns, the number and order of columns, the types of logic blocks included in the columns, the relative sizes of the logic blocks, and the interconnect/logic implementations included at the top of FIG. 1 are purely exemplary. For example, in an actual FPGA more than one adjacent column of CLBs is typically included wherever the CLBs appear, to facilitate the efficient implementation of user logic, but the number of adjacent CLB columns varies with the overall size of the FPGA.

In some PLDs, the programmable interconnect is heterogeneous in nature. In other words, at least two different types of routing elements are included in the programmable interconnect. For example, in U.S. Pat. No. 6,930,510, New et al. describe a programmable interconnect structure for a PLD that includes one set of interconnect resources designed for routing high-speed signals, and another set of interconnect resources that consume less power and can be used for routing non-critical signals. Thus, the overall power consumption of the device is reduced by using the high-speed, high-power interconnect resources only for the most critical paths in a user design.

As previously described, the FPGA disclosed by New at al. has a programmable interconnect structure in which the interconnect resources are divided into two groups. A first subset of the interconnect resources are optimized for high speed. A second subset of the interconnect resources are optimized for low power consumption. In some embodiments, the transistors of the first and second subsets have different threshold voltages. Transistors in the first subset, being optimized for speed, have a lower threshold voltage than transistors in the second subset, which are optimized for low power consumption. The difference in threshold voltages can be accomplished using well-known methods such as different doping levels or wells biased to different voltage levels, or by other means. In other embodiments, the interconnect resources include buffers optimized by varying voltage levels, transistor sizes, and so forth.

Therefore, it is clearly desirable to provide methods of routing user designs in programmable ICs having heterogeneous routing architectures, such that the routed designs can take advantage of the heterogeneity to reduce the overall power consumption of the user design.

SUMMARY OF THE INVENTION

The invention provides methods of routing user designs in programmable logic devices (PLDs) having heterogeneous routing structures, i.e., PLDs that include both high-power and low-power interconnect resources. A first pass routing step is performance-based, e.g., utilizes a cost function biased towards the high-power interconnect resources. The first routed design is then evaluated to identify non-critical nets in the first routed design that can yield the most power-saving benefit by being retargeted to the low-power interconnect resources. For example, a sorted list of nets can be created in which the identified nets are evaluated based on the capacitance per load pin of each net. A second pass routing step is then performed, e.g., rerouting the nets identified as being non-critical and having the greatest potential power-saving benefit. In some embodiments, the permitted increase in the delay of each rerouted net is bound by the slack of the net as routed in the first routed design.

The invention also provides computer-readable storage media that store code for performing these methods.

BRIEF DESCRIPTION OF THE DRAWINGS

The present invention is illustrated by way of example, and not by way of limitation, in the following figures.

DETAILED DESCRIPTION OF THE DRAWINGS

The present invention is applicable to a variety of programmable logic devices (PLDs). An appreciation of the present invention is presented by way of specific examples utilizing field programmable gate arrays (FPGAs). However, the present invention is not limited by these examples.

Figure 2:
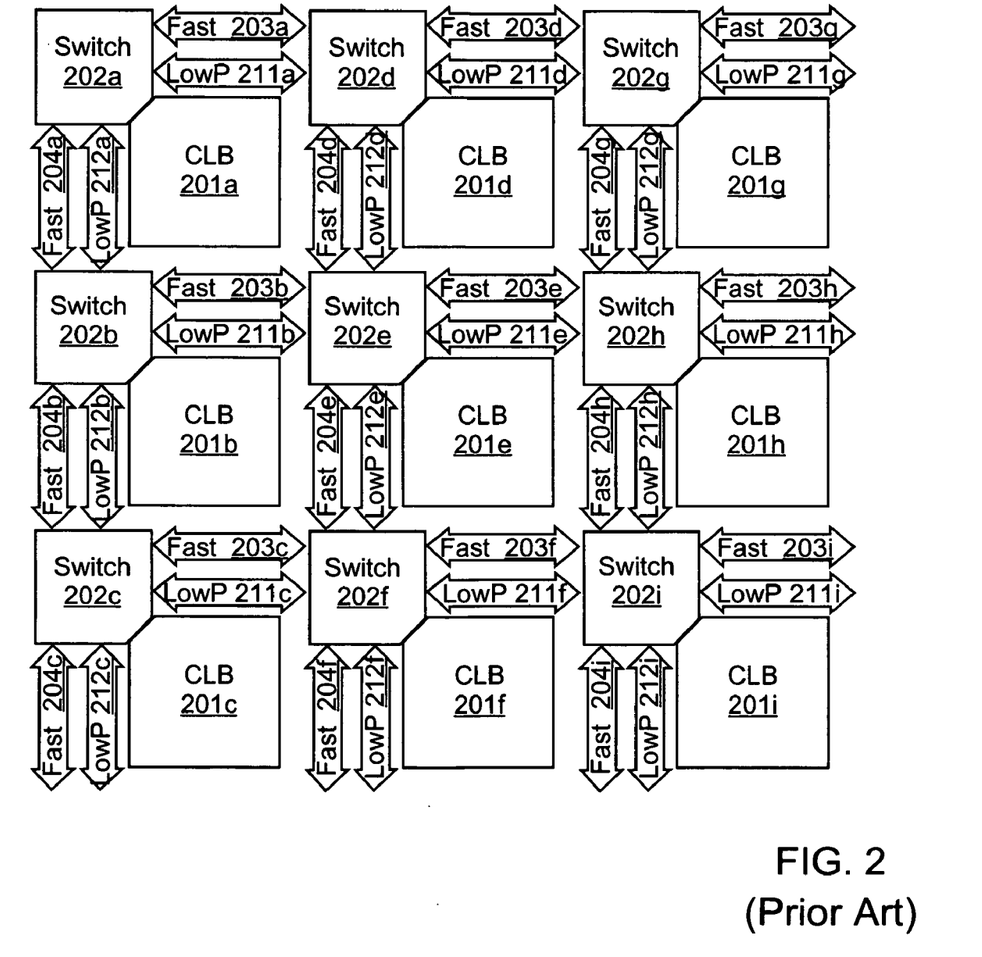
FIG. 2 is a simplified diagram of an FPGA that includes both fast (high-power) interconnect resources and low-power interconnect resources.

FIG. 2 illustrates a PLD as described by New at al. in U.S. Pat. No. 6,930,510 in which the programmable interconnect includes two different types of interconnect resources. A first set of resources is optimized for speed and a second set of resources optimized for low power consumption. Those of skill in the art will recognize that the first set of resources will have a relatively high power consumption, and the second set of resources will have a relatively low power consumption. The FPGA of FIG. 2 includes an array of logic blocks (CLBs 201a-201i) interconnected by a programmable interconnect structure. The interconnect structure includes interconnect lines (203a-203i, 204a-204i, 211a-211i, 212a-212i) coupled together by programmable switches (202a-202i).

A first set of the interconnect resources in FIG. 2 includes interconnect lines 203a-203i and 204a-204i. Additionally, the first set of interconnect resources can include a portion of programmable switches 202a-202i. The first set of resources is optimized for high speed. For example, these resources can be the same as those currently available in most FPGAs, where the interconnect resources are typically optimized for high speed. For example, long interconnect lines can be supplied for traversing multiple CLBs, and these long interconnect lines can be buffered.

A second set of the interconnect resources in FIG. 2 includes interconnect lines 211a-211i and 212a-212i. Additionally, the second set of interconnect resources can include a portion of programmable switches 202a-202i. The second set of resources is optimized for low power consumption. In some embodiments, the power consumption of the second set of resources is reduced by raising the effective threshold voltage of some or all of the transistors in the second set. Raising the effective threshold voltage of a transistor slows down the switching of the transistor, but reduces leakage current, thereby reducing the power consumption by the transistor.

As is well known in the relevant arts, the effective threshold voltage of a transistor can be raised using any of several techniques. For example, the threshold voltage of the transistor can be actually reduced by changing the doping levels in the transistor structure during manufacture of the FPGA. Clearly, reducing the actual threshold voltage of the transistor also reduces the effective threshold voltage. However, the threshold voltage of the transistor can also be effectively reduced (e.g., the "effective threshold voltage" can be reduced) by placing the transistor within a well, which is then biased to a voltage level different from the voltage level of the substrate used by other transistors (e.g., transistors within the first set of interconnect resources).

Figure 3:
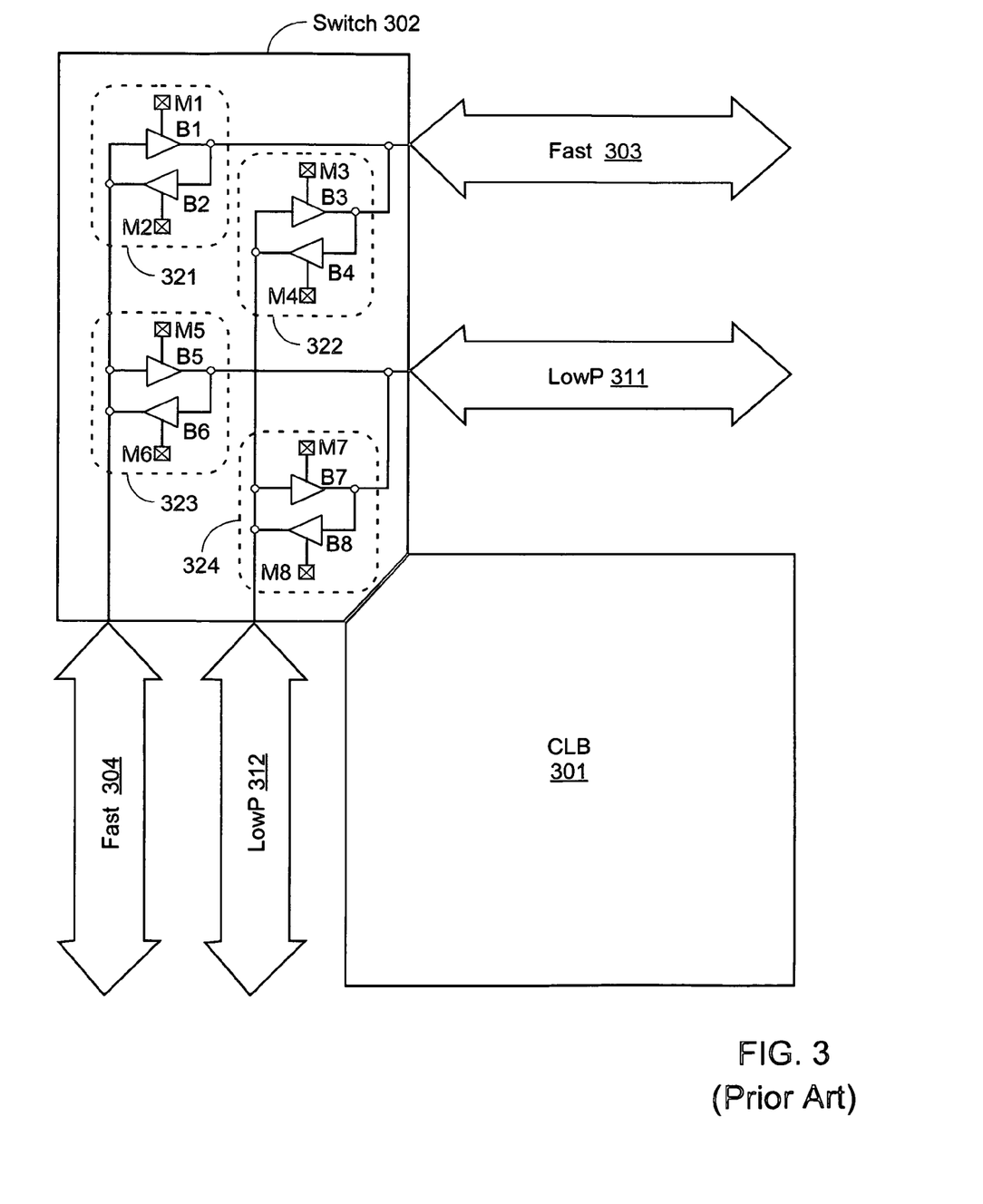
FIG. 3. illustrates a single tile in the FPGA of FIG. 2.

FIG. 3 illustrates in more detail one tile from the FPGA of FIG. 2. In the FPGA tile of FIG. 3, programmable switch 302 includes four areas 321-324. In the pictured embodiment, area 321 includes programmable tristate buffers B1, B2 controlled by configuration memory cells M1, M2. Area 322 includes programmable tristate buffers B3, B4 controlled by configuration memory cells M3, M4. Area 323 includes programmable tristate buffers B5, B6 controlled by configuration memory cells M5, M6. Area 324 includes programmable tristate buffers B7, B8 controlled by configuration memory cells M7, M8. (Each of the buffers and memory cells in FIG. 3 represents what would be many of these elements in an actual FPGA.)

In the embodiment of FIG. 3, the first set of interconnect resources optimized for high speed includes interconnect lines 303, 304, buffers B1, B2, and configuration memory cells M1, M2. The first set also includes buffers B3, B6 and configuration memory cells M3, M6, because these resources drive the interconnect lines optimized for high speed. The second set of interconnect resources optimized for low power includes interconnect lines 311, 312, buffers B7, B8, and configuration memory cells M7, M8. The second set also includes buffers B4, B5 and configuration memory cells M4, M5, because these resources drive the interconnect lines optimized for lower power.

In some embodiments, some or all of the transistors in the second set of resources have a higher threshold voltage than the transistors in the first set. As previously described, this higher threshold voltage reduces the power consumption of these transistors.

In some embodiments, the buffers in the first set are coupled to a different power source than the buffers in the second set. The buffers in the first set are coupled to a power source that supplies a higher voltage level, which increases the speed at which the buffers operate, but also increases the power consumption of the buffers.

In some embodiments, the buffers in the first set simply include transistors that are larger than corresponding transistors included in the buffers in the second set. Therefore, the buffers in the first set switch at higher speeds, but also consume more power than the buffers in the second set.

In some embodiments (not shown in FIG. 3), the fast interconnect resources include buffered interconnect lines, while the low-power interconnect resources include unbuffered interconnect lines. The unbuffered interconnect lines are slower, but have a significantly lower power consumption. In some embodiments, the interconnect lines are unidirectional, rather than bi-directional as shown in FIG. 3.

Preferably, the FPGA implementation software is designed to determine which signals in the user circuit should be allocated to the high-speed interconnect resources, and which signals can utilize the low-power interconnect resources without adversely affecting the performance of the circuit (or while minimizing the impact on performance). Presently available FPGA implementation software already includes timing-driven routing tools that determine which signals are critical to the performance of the circuit and which are non-critical. This software can be modified to implement the methods of the present invention, which are now described. The methods illustrated in FIGS. 4 and 5 can be practiced, for example, on the FPGA illustrated in FIGS. 2-3. However, these exemplary methods are not limited to the FPGA architectures disclosed herein, but can be applied to any PLD having a heterogeneous high- and low-power interconnect structure.

Figure 4:
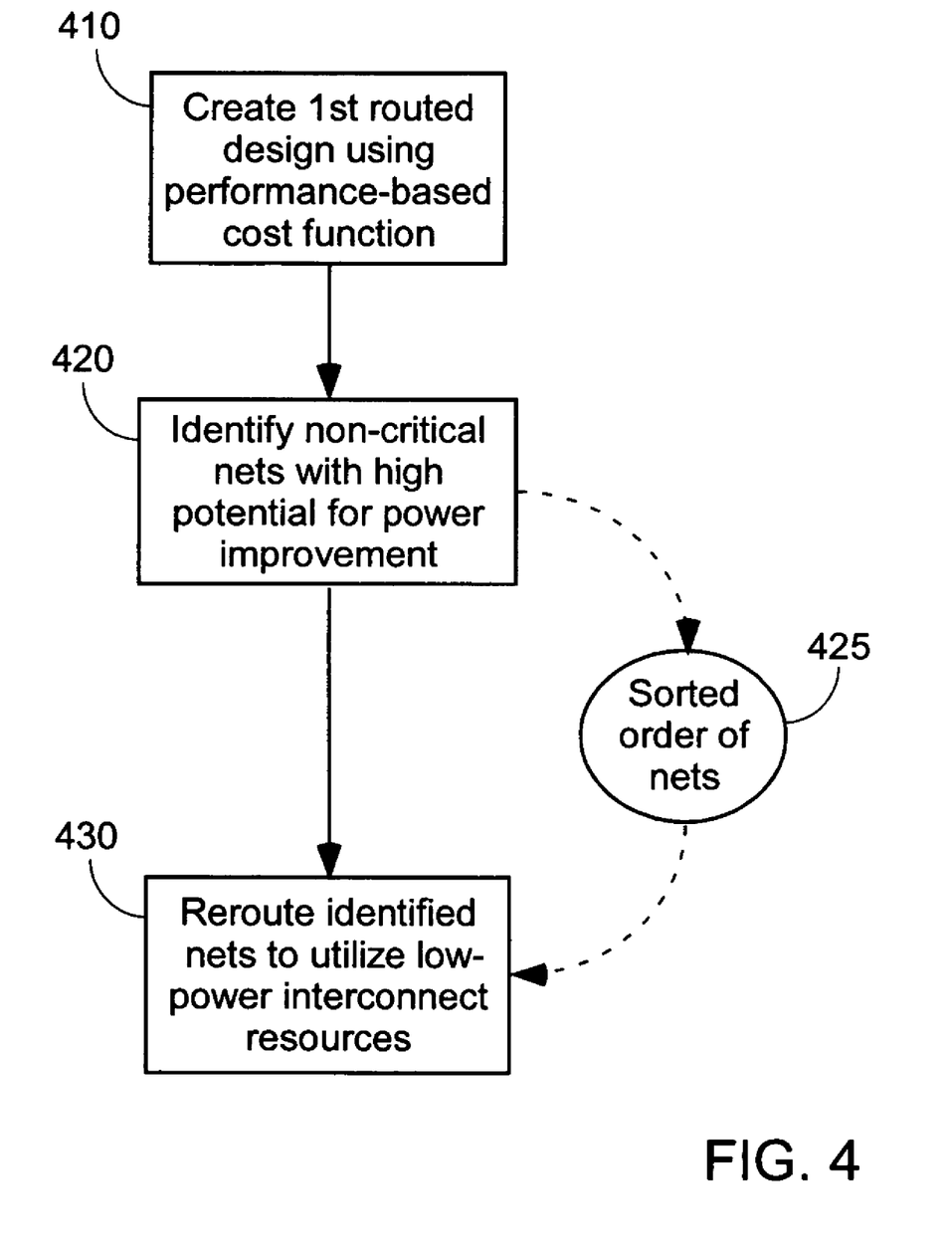
FIG. 4 illustrates the steps of a first method of routing a user design in a PLD that includes both high- and low-power interconnect resources.

FIG. 4 illustrates the steps of a first method of routing a user design in a PLD that includes both fast (high-power) interconnect resources and slow (low-power) interconnect resources. In step 410, a first routed design is created by routing the previously-placed user design using a performance-based cost function, e.g., in a timing-based router. Such timing-based routers are well known. Typically, a timing-based router uses a speeds file that describes the delay associated with each interconnect resource. In the embodiment of FIG. 4, the speeds file reflects the speed of the two different types of interconnect resources, the high-power resources and the low-power resources, which information is used in creating a first routed design that meets the specified timing requirements. A first cost function is applied in step 410. Because the high-power interconnect resources have better performance, the first cost function biases the initial choice of interconnect resources towards the high-power routing resources. In some embodiments, this bias may be mitigated by a congestion removal step, which will act to physically separate the assigned interconnect resources in the routed design. Such congestion removal software is well known.

One method of deriving the first cost function is to assign various "cost levels" to the different types of resources, utilize them in various combinations, and then to perform empirical tests to evaluate which version of the first cost function gave the best results, e.g., the design with the best performance.

After completing the first routing step, the first routed design is evaluated in step 420 to identify which nets are non-critical, and which of the non-critical nets have the highest potential for power improvement. For example, a sorted order 425 of nets can be created that sorts all of the non-critical nets in the design to determine which nets have the largest capacitance per load pin of each net.

In step 430, at least a subset of the nets identified in step 420 are rerouted to utilize the low-power routing resources. For example, the routing software can traverse the sorted order of nets 425 and reroute first the net with the highest capacitance per load pin, then the net with the second highest capacitance per load pin, and so forth. In some embodiments, a predetermined timing constraint is applied to the net to ensure that the rerouting does not cause the user design to miss the timing constraints placed on the design.

In the rerouting step (430), a second cost function can be used that assigns a higher cost to high-power interconnect resources than to low-power resources. As with the first cost function, one method of deriving the second cost function is to assign various "cost levels" to the different types of resources, utilize them in various combinations, and then to perform empirical tests to evaluate which version of the second cost function gave the best results, e.g., the lowest power implementation that still meets the timing requirements for the design. In some embodiments, the first and second cost functions are empirically evaluated in conjunction with one another to derive the best combination of cost levels for the final result.

In some embodiments, after each net has been rerouted, the power consumption of the net is compared to that of the previous routing (e.g., by comparing the capacitance after rerouting to the capacitance prior to rerouting). If the power consumption has not been reduced by the rerouting, the net is returned to its original routing. In this manner, the low-power interconnect resources are utilized only by the nets that can benefit from their use.

Figure 5:
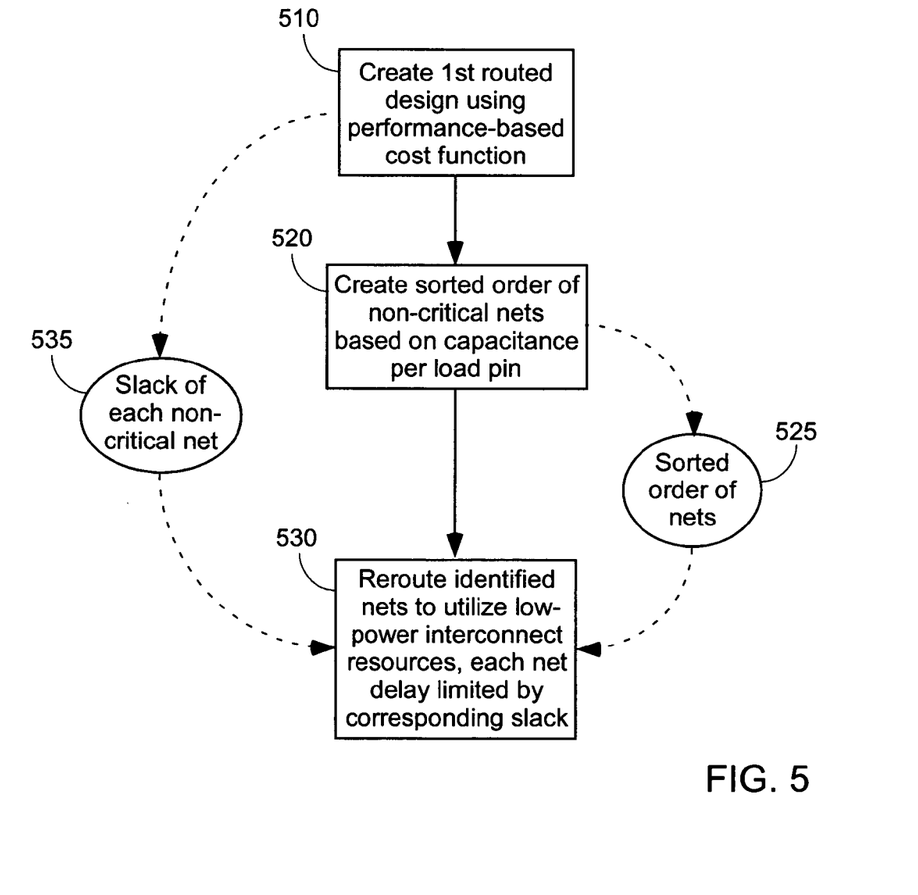
FIG. 5 illustrates the steps of a second method of routing a user design in a PLD that includes both high- and low-power interconnect resources.

FIG. 5 illustrates the steps of a second method of routing a user design in a PLD that includes both fast (high-power)

interconnect resources and slow (low-power) interconnect resources. In step 510, a first routed design is created by routing the previously-placed user design using a performance-based cost function, e.g., by a timing-based router as in step 410 of FIG. 4. In step 520 a sorted order 525 of non-critical nets is created based on the capacitance per load pin of each non-critical net in the first routed design. In step 530, at least a subset of the nets identified in step 520 are rerouted to utilize the low-power routing resources. The non-critical nets are rerouted in an order specified by the sorted order of non-critical nets. The permissible increase in the delay of each rerouted net is bound by (i.e., limited by) the slack 535 of the non-critical net in the first routed design. The slack of a non-critical net is the amount of delay that can be added to the net without impacting the overall performance of the user design. Using the slack of the net (as originally routed) as a limit to the amount of delay that can be added to each net ensures that the performance of the user design does not suffer as a result of the power optimization rerouting step (step 530).

As in the embodiment of FIG. 4, after each net has been rerouted, the power consumption of the net is compared to that of the previous routing (e.g., by comparing the capacitance after rerouting to the capacitance prior to rerouting). If the power consumption has not been reduced by the rerouting, the net is returned to its original routing. In this manner, the low-power interconnect resources are utilized only by the nets that can benefit from their use.

In some embodiments (not shown), the sorted order of nets can include critical nets in addition to non-critical nets. A performance-based cost function (e.g., see step 410 in FIG. 4, step 510 in FIG. 5) typically reroutes any net that does not meet the specified timing requirement, but does not attempt to reroute any net that does meet the specified timing requirement. In other words, some nets may be marked as "critical nets" that are critical only because the router made no attempt to improve the route. Therefore, it may be advantageous in some embodiments to include critical nets in the sorted order of nets (425, 525).

The methods of the present invention can be performed in either hardware, software, or any combination thereof, as those terms are currently known in the art. In particular, the present methods can be carried out by software, firmware, or microcode operating on a computer or computers of any type. Additionally, software embodying the present invention can comprise computer instructions in any form (e.g., source code, object code, interpreted code, etc.) stored in any computer-readable medium (e.g., ROM, RAM, magnetic media, punched tape or card, compact disc (CD) in any form, DVD, etc.). Further, such software can also be in the form of a computer data signal embodied in a carrier wave, such as that found within the well-known Web pages transferred among computers connected to the Internet. Accordingly, the present invention is not limited to any particular platform, unless specifically stated otherwise in the present disclosure.

Those having skill in the relevant arts of the invention will now perceive various modifications and additions that can be made as a result of the disclosure herein. For example, the above text describes the circuits and methods of field programmable gate arrays (FPGAs). However, methods of the invention can also be practiced using other programmable logic devices including high-power and low-power interconnect resources.

Accordingly, all such modifications and additions are deemed to be within the scope of the invention, which is to be limited only by the appended claims and their equivalents.

What is claimed is:

1. A method of routing a user design in a programmable logic device (PLD) including both high-power interconnect resources and low-power interconnect resources, the method comprising:
   creating a first routed design by routing the user design in the PLD using a first cost function based on performance of the first routed design;
   wherein the first cost function assigns a higher cost to the low-power interconnect resources than to the high-power interconnect resources, and the assigned costs of the first cost function bias creation of the first routed design toward use of the high-power interconnect resources;
   identifying a plurality of identified nets in the first routed design, wherein the identified nets comprise non-critical nets in the first routed design and wherein the identified nets meet a criterion for high potential for power improvement; and
   creating a second routed design by rerouting at least one of the identified nets to utilize the low-power interconnect resources, using a second cost function different from the first cost function;
   wherein the second cost function assigns a higher cost to the high-power interconnect resources than to the low-power interconnect resources, and the assigned costs of the second cost function bias rerouting of at least one of the identified nets toward use of the low-power interconnect resources, and
   wherein identifying the plurality of identified nets in the first routed design comprises creating a sorted order of nets based on capacitance per load pin of each net in the first routed design.

2. The method of claim 1, wherein the criterion for high potential for power improvement comprises a minimum capacitance per load pin.

3. The method of claim 1, wherein creating the second routed design comprises rerouting each of the at least one of the identified nets only when a predetermined timing constraint can be met by the respective identified net.

4. The method of claim 1, wherein each of the identified nets has at least a predetermined minimum slack value.

5. The method of claim 1, wherein:
   creating the first routed design comprises utilizing a speeds file that reflects the speed of the high-power interconnect resources and further reflects the speed of the low-power interconnect resources; and
   creating the second routed design comprises utilizing the same speeds file used in creating the first routed design.

6. The method of claim 1, wherein:
   creating the first routed design comprises utilizing a cost function that biases the initial choice of interconnect resources in the PLD towards the high-power interconnect resources.

7. The method of claim 1, further comprising creating a third routed design, wherein the rerouting of each of the at least one of the identified nets causes a change in a power consumption of the identified net, and the third routed design is the second routed design with each of the at least one of the identified nets returned to the routing of the first routed design in response to the power consumption of the identified net not being reduced.

8. A method of routing a user design in a programmable logic device (PLD) including both high-power interconnect resources and low-power interconnect resources, the method comprising:

creating a first routed design by routing the user design in the PLD using a first cost function, the first cost function being a performance-based cost function;

creating a sorted order of non-critical nets in the first routed design based on capacitance per load pin of each non-critical net in the first routed design; and creating a second routed design by rerouting at least one of the non-critical nets to utilize the low-power interconnect resources, the rerouting using a second cost function different from the first cost function, wherein the at least one of the non-critical nets are rerouted in an order specified by the sorted order of non-critical nets, and wherein the increase in the delay of each non-critical net is bound by the slack of the non-critical net in the first routed design, wherein the first cost function assigns a higher cost to the low-power interconnect resources than to the high-power interconnect resources, and the assigned costs of the first cost function bias creation of the first routed design toward use of the high-power interconnect resources, and wherein the second cost function assigns a higher cost to the high-power interconnect resources than to the low-power interconnect resources, and the assigned costs of the second cost function bias rerouting of at least one of the identified nets toward use of the low-power interconnect resources.

9. The method of claim 8, wherein the performance-based cost function assigns a higher cost to the low-power interconnect resources than to the high-power interconnect resources.

10. The method of claim 8, wherein:

creating the first routed design comprises utilizing a speeds file that reflects the speed of the high-power interconnect resources and further reflects the speed of the low-power interconnect resources; and creating the second routed design utilizes the same speeds file used in creating the first routed design.

11. The method of claim 8, wherein:

the performance-based cost function biases the initial choice of interconnect resources in the PLD towards the high-power interconnect resources.

12. A computer-readable storage medium comprising computer-executable code for routing a user design in a programmable logic device (PLD) including both high-power interconnect resources and low-power interconnect resources, the storage medium comprising:

code for creating a first routed design by routing the user design in the PLD using a first cost function based on performance of the first routed design;

wherein the first cost function assigns a higher cost to the low-power interconnect resources than to the high-power interconnect resources, and the assigned costs of the first cost function bias creation of the first routed design toward use of the high-power interconnect resources;

code for identifying a plurality of identified nets in the first routed design, wherein the identified nets comprise non-critical nets in the first routed design and wherein the identified nets meet a criterion for high potential for improvement; and code for creating a second routed design by rerouting at least one of the identified nets to utilize the low-power interconnect resources, using a second cost function different from the first cost function;

wherein the second cost function assigns a higher cost to the high-power interconnect resources than to the low-power interconnect resources, and the assigned costs of the second cost function bias rerouting of at least one of the identified nets toward use of the low-power interconnect resources, and wherein the code for identifying the plurality of identified nets in the first routed design comprises code for creating a sorted order of nets based on capacitance per load pin of each net in the first routed design.

13. The computer-readable storage medium of claim 12, wherein the criterion for high potential for improvement comprises a minimum capacitance per load pin.

14. The computer-readable storage medium of claim 12, wherein the code for creating the second routed design comprises code for rerouting each of the at least one of the identified nets only when a predetermined timing constraint can be met by the respective identified net.

15. The computer-readable storage medium of claim 12, wherein each of the identified nets has at least a predetermined minimum slack value.

16. The computer-readable storage medium of claim 12, wherein:

the code for creating the first routed design comprises code for utilizing a speeds file that reflects the speed of the high-power interconnect resources and further reflects the speed of the low-power interconnect resources; and the code for creating the second routed design comprises code for utilizing the same speeds file used in creating the first routed design.

17. The computer-readable storage medium of claim 12, wherein:

the code for creating the first routed design comprises code for utilizing a cost function that biases the initial choice of interconnect resources in the PLD towards the high-power interconnect resources.

18. The method of claim 3, wherein the rerouting of each of the at least one of the identified nets causes an increase in a delay of the identified net, and the rerouting of each of the at least one of the identified nets only when a predetermined timing constraint can be met includes rerouting the identified net in response to the increase in the delay of the identified net being limited to a slack of the identified net in the first routed design.

* * * * *